Nov. 7, 1967 P. S. SWARTZ ET AL 3,351,437

SUPERCONDUCTIVE BODY OF NIOBIUM-TIN

Filed June 10, 1963

Inventors:
Paul S. Swartz,
Carl H. Rosner,
by Paul R. Webb, II
Their Attorney.

United States Patent Office 3,351,437

Patented Nov. 7, 1967

3,351,437

SUPERCONDUCTIVE BODY OF NIOBIUM-TIN

Paul S. Swartz and Carl H. Rosner, Schenectady, N.Y., assignors to General Electric Company, a corporation of New York Filed June 10, 1963, Ser. No. 287,739

1 Claim. (Cl. 29—182)

This application is a continuation-in-part of our copending application filed Nov. 6, 1961, Ser. No. 150,283, now abandoned, and a continuation-in-part of our copending application filed Mar. 2, 1962, Ser. No. 180,918, now abandoned, and both assigned to the same assignee as the present application.

This invention relates to superconductive bodies in bulk form and more particularly to high critical field superconductive bodies in bulk form containing a reaction product of a high field superconducting material.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous in magnets, generators, direct current motors and low frequency transformers, and to advances in cryogenics which removed many of the economic and scientific problems involved in extremely low temperature operations.

As is well known, superconduction is a term describing the type of electrical current conduction existing in certain materials cooled below a critical temperature, $T_c$, where resistance to the flow of current is essentially nonexistent. It would be desirable to provide high critical field superconductive bodies in bulk form containing a reaction product of a high field superconducting material. Bulk bodies include various configurations. It would also be advantageous to provide methods of forming such bodies.

It is the object of our invention to provide a high critical field superconductive body in bulk form.

In carrying out our invention in one form, a method of forming a high critical field superconductive body in bulk form comprises compacting two metal powders, and heating the powders in a non-deleterious atmosphere thereby forming a body containing a reaction product of a high field superconducting material.

Figure 1:
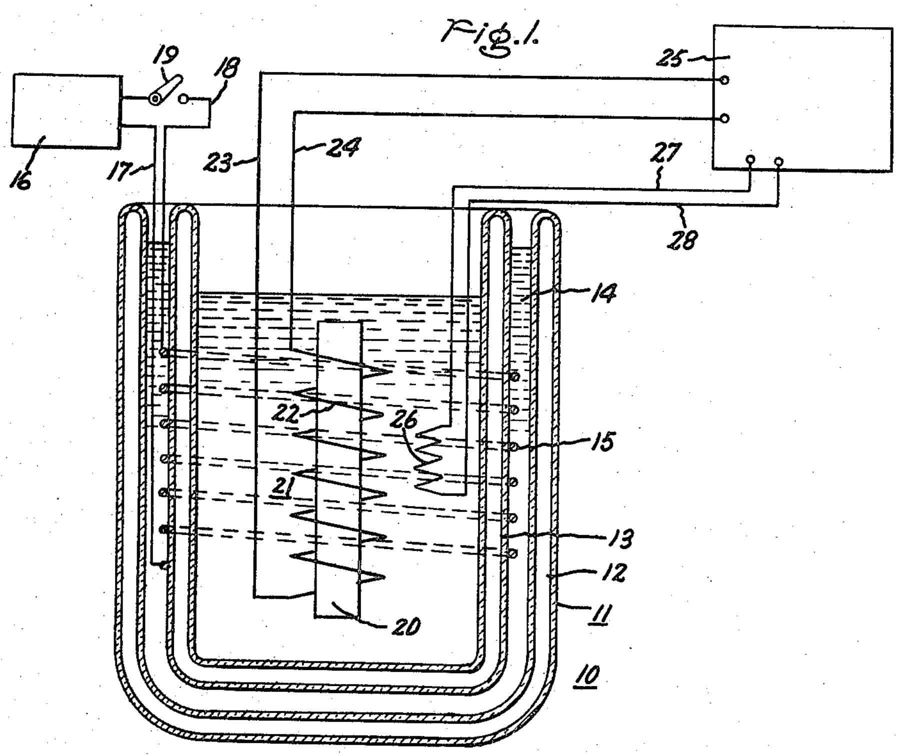
Figure 2:
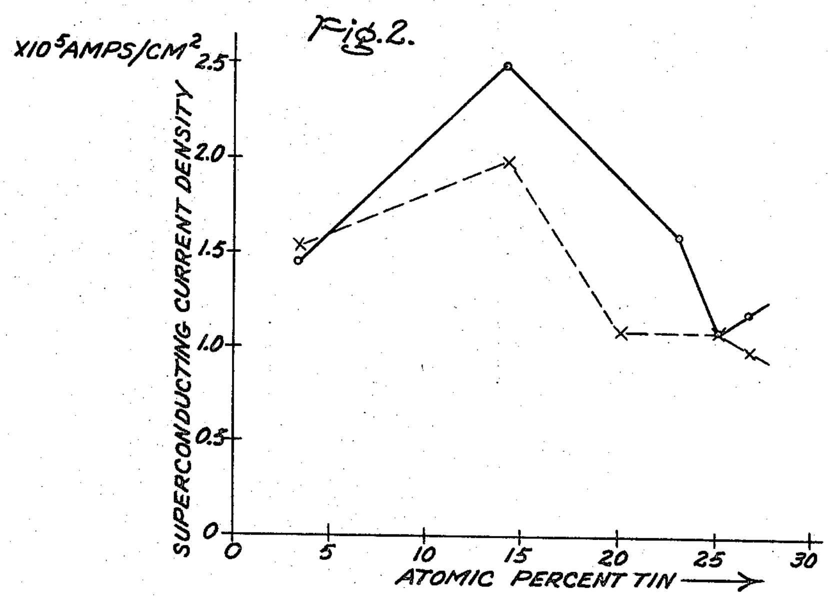

These and various other objects, features, and advantages of the invention will be better understood from the following description taken in connection with the accompanying drawing in which:

FIGURE 1 is a sectional view of apparatus employed to measure flux penetration into a high critical field superconductive body in bulk form; and FIGURE 2 is a graph showing atomic percent tin in a high critical field superconductive body in bulk form of columbium and tin versus superconducting current density.

We discovered that high critical superconductive bodies in bulk form could be formed by compacting two metal powders, and heating these compacted powders in a non-deleterious atmosphere thereby forming a body containing a reaction product of a high field superconducting material. The reaction product comprises from a few percent to one hundred percent of the volume of the superconductive body. A metal, such as niobium, molybdenum or vanadium, can be employed as the first metal powder while a metal, such as tin, aluminum, zirconium, rhenium, silicon or gallium, can be employed as the second metal powder. For example, the above metal powders can be compacted to form bodies of niobium and tin; niobium and aluminum; niobium and zirconium; molybdenum and rhenium; vanadium and silicon; and vanadium and gallium. The formed bodies of molybdenum and rhenium, and niobium and zirconium contain a reaction product of many alloys which are high field superconducting material. The formed bodies of niobium and tin, niobium and aluminum, vanadium and silicon, and vanadium and gallium contain reaction products of high field superconducting alloys of $Nb_3Sn$, $Nb_3Al$, $V_3Si$ and $V_3Ga$, respectively.

We found further that high critical superconductive bodies in bulk form could be formed by compacting two metal powders as discussed above, and heating the compacted powders with a third metal in liquid or gaseous state in a non-deleterious atmosphere thereby forming a body containing a reaction product of a high field superconducting material. The third metal is generally identical with one of the above metals contained in the compacted powder. For example, we prefer to react compacted powders of niobium and tin with molten tin. However, a third metal which is different from either of the metals of the compacted powders can be employed. For example, compacted powders of niobium and zirconium can be reacted with tin. The compacted metal powders are reacted with the third metal, for example, by infiltrating the compacted powders with a third metal by contacting the compacted powders with a molten third metal or by exposing the compacted powders to vapors of the third metal.

For example, the compacted metal powders are positioned in molten metal within a non-reacting container. An atmosphere which is non-deleterious to the formation of the desired reaction, such as an argon atmosphere or other inert atmosphere, is confined above the molten metal. A vacuum can also be employed. If desired, pressure can be applied to the molten metal to improve the infiltration. If a vapor is employed, the third metal is heated to produce a vapor to which the compacted metal powders, positioned within an evacuated enclosure, are subjected. Temperatures and time periods are chosen for the infiltration of the compacted metal powders with the third metal to produce a body containing a reaction product of a high field superconducting material.

In FIGURE 1 of the drawing, apparatus is shown generally at 10 for measuring flux penetration of a high critical field body at a temperature of 4.2° K. Apparatus 10 comprises an insulated container 11 having an outer insulated vessel 12 and an inner insulated vessel 13 separated by liquid nitrogen 14. A solenoid 15 is positioned within liquid nitrogen 14 in vessel 12 and is connected to a power source 16 by means of leads 17 and 18. A switch 19 is provided in lead 18 between solenoid 19 and power source 16 to energize and de-energize solenoid 15 to create a magnetic field. A bulk high critical field superconductive body 20 in the form of a rod is positioned within liquid helium 21 in vessel 13 and within the magnetic field created by solenoid 15. A coil 22 is positioned around body 20 and connected by leads 23 and 24 to a DC hysteresigraph 25. A search coil 26 is positioned adjacent body 20 and connected by leads 27 and 28 to DC hysteresigraph 25. A search coil 26 is positioned adjacent body 20 and connected by leads 27 and 28 to DC hysteresigraph 25. Coil 22 measures the amount of magnetic flux penetration into body 20 versus the applied magnetic field from solenoid 15. Search coil 26 measures the magnitude of the magnetic field from solenoid 15.

In the operation of apparatus 10 in FIGURE 1, body 20 is positioned within coil 22 in vessel 13. Liquid helium is poured into vessel 13 to immerse body 20 and cools body 20 to liquid helium temperature, 4.2° K. Switch 19 is closed to energize solenoid 15 to create a magnetic field within body 20 which magnetic field is increased from zero to some magnetic field, $H_a$, and reduced again to zero. Upon increasing the field gradually, magnetic flux penetration is recorded on the Y-axis of hysteresigraph 25. Upon subsequent reduction of the magnetic field to zero, only part of the penetrated magnetic flux, usually one-half, comes out again. The magnetic field is then increased to $-H_a$ and back again to zero. The vertical axes of the hysteresis loops displayed on hysteresigraph 25 are calibrated in terms of a magnetic flux density, $H_p$, averaged over the entire cross-section of body 20. Maximum vertical deflection occurs when no magnetic flux is excluded from body 20 and the magnetic flux density within body 20 is the same as the applied magnetic flux density.

Hence, the total magnetic flux $\Phi_p$, penetrating into the walls of body 20 is $\Phi = H_p \pi R^2$ where R is the radius of body 20. The depth, D, to which this magnetic flux penetrates is given by:

$$D = \frac{2\phi_p}{H_a(2\pi R)}$$

$$= \frac{H_p R}{H_a}$$

If a magnetic field, $H_a$, is applied to a high critical field superconductive body in a superconducting state, the magnetic field will penetrate into the surface of the body to a depth given by:

$$D = \frac{10 H_a}{4\pi J}$$

where J is the critical superconducting current density assumed to be independent of the magnitude of the applied magnetic field, $H_a$. From the above equation, the average superconducting current density, $\bar{J}$, between O and $H_a$ is calculated as:

$$\bar{J} = \frac{10 H_a^2}{4\pi R H_p}$$

In FIGURE 2, a graph shows atomic percent tin in a high critical field superconductive body in bulk form of columbium and tin versus superconducting current density in units of $10^5$ amperes per square centimeter. The points for this graph were obtained in the following manner.

Five high critical field superconductive bodies in bulk form were prepared by hydrostatically compacting niobium and tin powders with atomic ratios of tin of 3.2 percent, 14.3 percent, 23.1 percent, 25.0 percent and 26.8 percent into rods at a pressure of 100,000 pounds per square inch. The rods were vacuum-sintered for two hours at 1000° C. and cooled slowly to produce high critical field superconductive bodies in bulk form. Each body was machined to a diameter of 0.500 inch and a length of 0.750 inch.

Each of these bodies was positioned within coil 20 in liquid helium 21 in the apparatus shown generally in FIGURE 1 of the drawing. The apparatus was operated as described above and the average superconducting current density, $\bar{J}$ between zero and $H_a$ was calculated for each of these bodies. These current densities, which are plotted on and connected by a solid line in the graph in FIGURE 2, were calculated as 1.45, 2.5, 1.6, 1.1 and $1.2 \times 10^5$ amperes per square centimeter in fields up to 7000 oersteds for the respective bodies. Each body has a reaction product of a high field superconducting material.

A second group of five high critical field superconductive bodies in bulk form were prepared by hydrostatically compacting niobium and tin powders with atomic ratios of tin of 3.2 percent, 14.3 percent, 23.1 percent, 25.0 percent and 26.8 percent into rods at a pressure of 100,000 pounds per square inch. The rods were sintered in molten tin for two hours at 1000° C. and cooled slowly to produce high critical field superconductive bodies in bulk form. Each body was machined to a diameter of 0.500 inch and a length of 0.750 inch.

Each of these bodies was positioned within a coil 22 in liquid helium 21 in the apparatus shown generally in FIGURE 1 of the drawing. The apparatus was operated as described above and the average superconducting current density, $\bar{J}$, between zero and $H_a$ was calculated for each of these bodies. These current densities, which are plotted on and connected by a dashed line in the graph in FIGURE 2, were calculated as 1.55, 2.0, 1.1, 1.1 and $1.0 \times 10^5$ amperes per square centimeter in fields up to 7000 oersteds for the respective bodies. Each body has a reaction product of a high field superconducting material.

We found an article consisting of 14.3 atomic percent tin and the balance being niobium which was subsequently sintered in vacuum, exhibited a superconducting current density of $2.5 \times 10^5$ amperes per square centimeter in a field up to 7000 oersteds at a temperature of 4.2° K. We found further that an article consisting of 14.3 atomic percent tin and the balance being niobium which was subsequently immersed in tin exhibited a high superconducting current density of $2.0 \times 10^5$ amperes per square centimeter in a field up to 700 oersteds at a temperature of 4.2° K. Both of the above current densities are substantially higher than the current density of such a body with 25 atomic percent tin.

While other modifications of this invention and variations thereof which may be employed within the scope of the invention have not been described, the invention is intended to include such that may be embraced within the following claim:

What we claim as new and desire to secure by Letters Patent of the United States is:

A high field superconductive body in bulk form which consists of 14.3 atomic percent tin, the balance being niobium, and said body containing a reaction product of $Nb_3Sn$.

References Cited

UNITED STATES PATENTS

| | | | |
|---|---|---|---|
| 2,714,556 | 8/1955 | Goetzel | 29—182.1 |
| 2,755,184 | 7/1956 | Turner et al. | 29—182 |
| 2,843,501 | 7/1958 | Ellis et al. | 29—182.1 |
| 3,028,341 | 4/1962 | Rosi et al. | |
| 3,084,041 | 4/1963 | Zegler et al. | 75—213 |
| 3,124,455 | 3/1964 | Buehler et al. | 75—214 |
| 3,181,936 | 5/1965 | Denny et al. | 29—198 X |

OTHER REFERENCES

Kunzler et al.: Physical Review Letters, 6(3), Feb. 1, 1961, pp. 89–91.

Zeitschrift für Physik, vol. 151, 1958. QC 1.Z41, pp. 308–310.

L. DEWAYNE RUTLEDGE, *Primary Examiner.*

REUBEN EPSTEIN, LEON D. ROSDOL, *Examiners.*

R. L. GOLDBERG, R. L. GRUDZIECKI, *Assistant Examiners.*